UNITED STATES PATENT OFFICE.

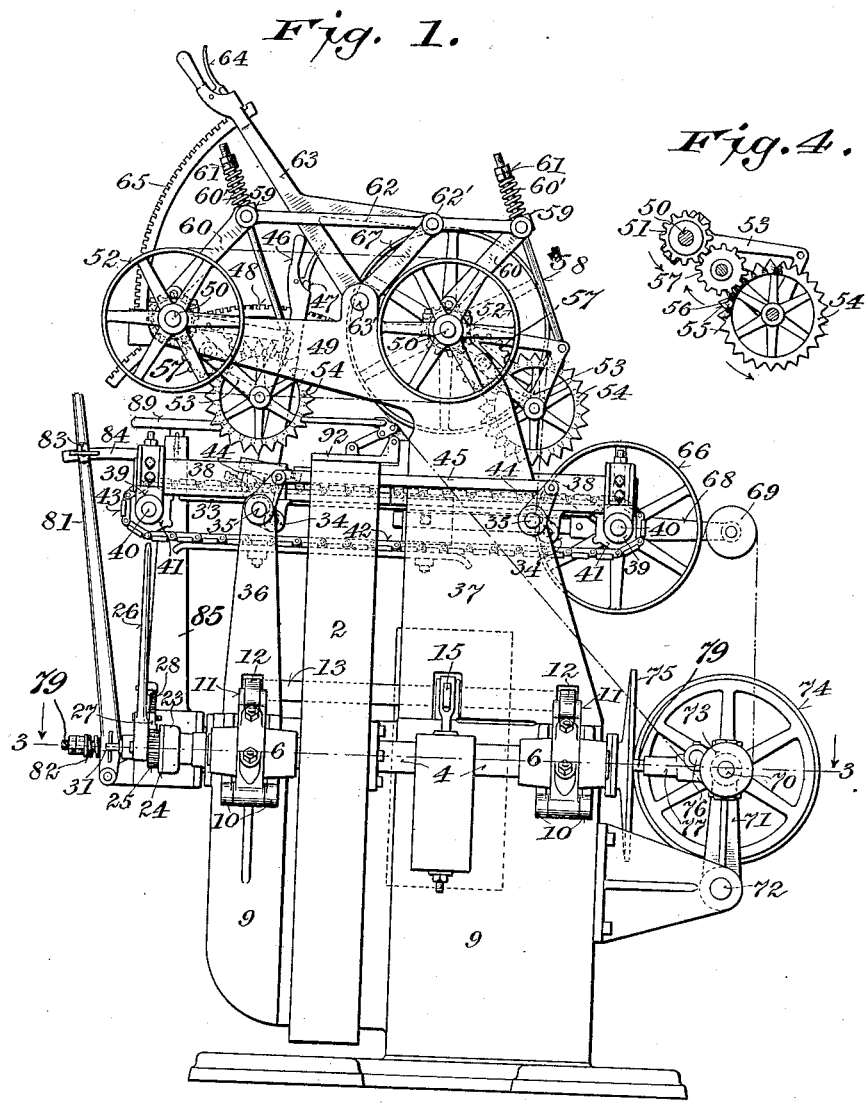

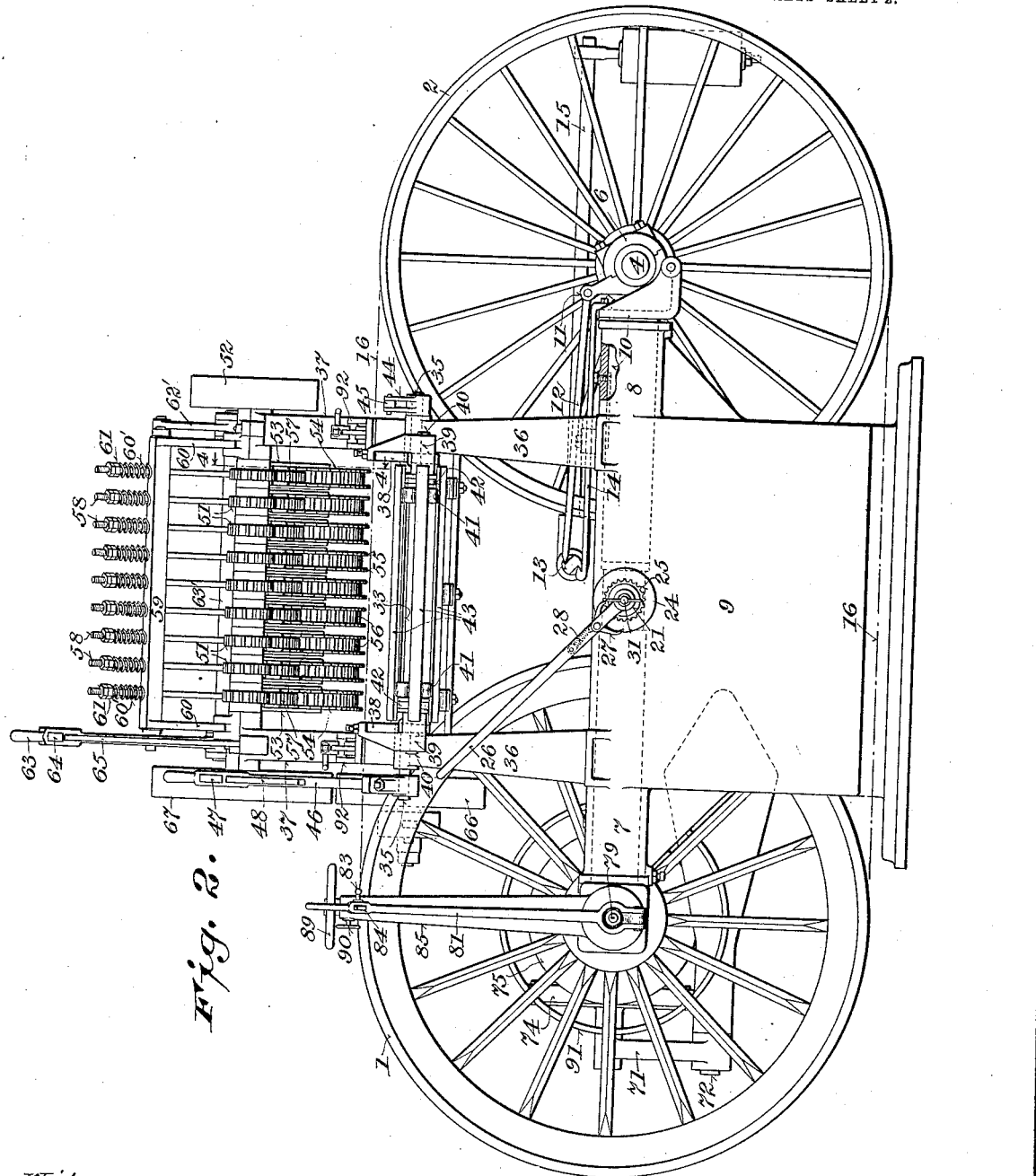

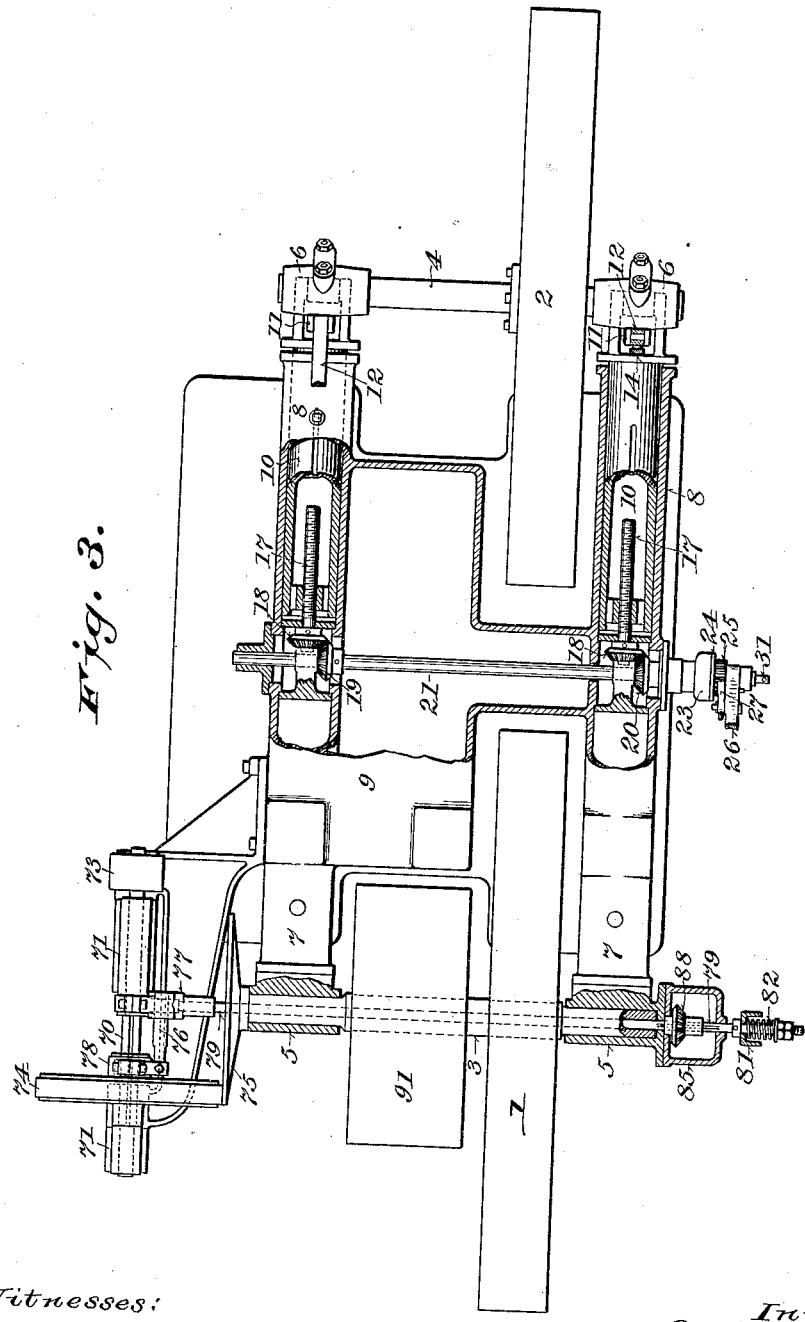

GEORGE M. PELTON, OF MILWAUKEE, WISCONSIN, ASSIGNOR TO THE FILER & STOWELL COMPANY, OF MILWAUKEE, WISCONSIN, A CORPORATION OF WISCONSIN.

RESAWING-MACHINE.

1,109,012.  Specification of Letters Patent.  Patented Sept. 1, 1914.

Application filed July 25, 1910. Serial No. 573,726.

*To all whom it may concern:*

Be it known that I, GEORGE M. PELTON, a citizen of the United States, residing at Milwaukee, in the county of Milwaukee and State of Wisconsin, have invented certain new and useful Improvements in Resawing-Machines, of which the following is a specification, reference being had to the accompanying drawing, forming a part thereof.

This invention relates more particularly to horizontal band resawing machines.

Its main objects are to provide such machines with positive and reliable means for feeding lumber of irregular shape or varying dimensions, such as slabs and cants, as well as lumber of different thickness or dimensions to the saw; and generally to improve the construction and operation of machines of this class.

It consists in the construction, arrangement and combination of parts as hereinafter particularly described and defined in the claims.

In the accompanying drawings like characters designate the same parts in the several figures.

Figure 1 is a side elevation of a horizontal band resawing machine embodying the invention; Fig. 2 is a front elevation of the machine as viewed from the left with relation to Fig. 1; Fig. 3 is a plan view and horizontal section on the line 3 3, Fig. 1; and Fig. 4 is a vertical section on the line 4 4, Fig. 2, showing one of the toothed feed wheels with the gear train and one of the swinging arms associated therewith.

Referring to Figs. 1, 2 and 3, 1 and 2 are the band wheels mounted on shafts 3 and 4, which are supported by boxes 5 and 6 carried by arms 7 and 8 projecting laterally from the pedestal or base section 9 of the frame. The boxes 6 are pivoted on the underside to the outer ends of slides 10 fitted in the tubular arms 8 and have upwardly projecting arms 11 to which are pivoted the outer ends of horizontal bars or compression members 12 of a saw straining or tension device.

The inner pointed or knife-edge ends of the members 12 engage with undercut shoulders in a horizontal shaft 13 parallel with the band wheel shafts, as shown in Fig. 2. Tension bars 14 fastened at their outer ends to the slides 10, are formed at their inner ends with pointed or knife-edged hooks which engage with undercut shoulders in the opposite side of the shaft 13 from those with which the compression members 12 engage.

A weighted lever 15, fixed on the shaft 13, tends to turn the boxes 6 outward on their pivot connections with the slides 10 and thus subjects the saw, indicated by the broken line 16 on Fig. 2, to the requisite working strain or tension.

The slides are adjusted in or out to compensate for variations in the length of saws and to render the above described straining or tension mechanism effective, by means of screws 17 working in nuts in said slides and having fixed bearings in the arms 8. These screws are provided at their inner ends with bevel gears 18, which mesh with similar gears 19 and 20, on a shaft 21, parallel with the band wheel shafts 3 and 4. The gear 19 is fixed on the shaft 21, but the gear 20 is loosely mounted on said shaft and is rigidly connected with a clutch member 23. The other clutch member 24 is keyed or otherwise fastened on the shaft 21 and is formed or provided with a ratchet wheel 25. A hand lever 26 is loosely mounted on the shaft 21 next to the ratchet wheel 25, and is provided with a double toothed reversible pawl or dog 27 pivoted thereto in position to work with said ratchet wheel. Either tooth of said pawl is held in yielding engagement with the ratchet wheel by a spring 28, the pawl being reversed by hand so that by rocking the lever 26 to and fro, the shaft 21 and the screws 17 may be turned in either direction for moving the band wheel 2 in or out as desired.

In order to adjust one end of the band wheel shaft 4 in or out, or to change the alinement of said shaft and thus train the band wheel 2 so that the saw will run properly, one of the screws 17 may be thrown out of gear with the shaft 21. For this purpose a sliding rod 31 is fitted in an axial bore in the outer end of the shaft 21, to connect and disconnect the clutch members 23 and 24.

The lumber is guided and fed to the saw on a vertically adjustable support below and parallel with the plane of the upper side of the saw. This support comprises a bed 33, pivotally connected with and carried by crank arms 34 on transverse rocker shafts 35, which have bearings in standards 36 and 37 extending upwardly from the pedestal or base section 9 of the frame. The bed 33 is formed or provided adjacent to the ends, with side guides 38, to which are fastened, as shown in Fig. 2, vertically adjustable bearings 39, and in these bearings are mounted parallel with the rocker shafts 35, shafts 40, on which are mounted drums or sprocket wheels 41. On these sprocket wheels or drums is mounted an endless belt consisting of link belts 42 and cross slats 43, fastened at intervals to said belts, the cross slats running upon the sprocket wheels or drums just inside of the link belts, as shown in Fig. 2. The rocker shafts 35 are provided at one end with crank arms 44, which are connected by a rod 45 so that they will move together, and both ends of the bed 33 and the traveling support will be raised and lowered simultaneously to the same extent. The opposite end of the front rocker shaft 35 is provided with a hand lever 46, which has a latch 47 working with a notched quadrant or arc 48 for determining the adjustment of the bed and traveling support and locking and holding them in adjusted position. The lever has an adjustable connection with the rocker shaft, as indicated in Fig. 1 for varying the adjustment of the bed and traveling support between the notches of the quadrant or arc 48, and also for turning the lever down out of the way, to permit the removal of the saw from the band wheels.

Above the saw in the standards 37 and overhanging arms 49 thereof, are mounted parallel with the bed 33 and saw 16, shafts 50, each of which is provided with a series of gears 51 and at one end with pulleys 52 which are connected by a belt, as shown in Fig. 1, so as to be rotated together at the same speed. Upon the shafts are pivotally mounted on each side of the several gears 51, swinging arms 53, which are preferably made of triangular form, as shown in Figs. 1 and 4. Between the several pairs of arms at the lower or free ends thereof, are rotatably mounted toothed feed wheels 54, each of which is preferably formed, as shown in Figs. 2 and 4, with two toothed rims 55 and an intermediate open toothed gear 56, which is connected by an idle gear 57 carried by the arms 53 with the associated driving gear 51 on the shaft 50. The openings between the teeth of the gears 56 prevent their becoming clogged with sawdust or other foreign matter. Each of these feed wheels is movable up and down with the swinging arms 53 independently of the others, and is connected by a rod 58 with a stop bar 59 parallel with the associated shaft 50, and connected adjacent thereto with the frame by radius arms 60. The rods 58 are pivoted at their lower ends to the arms 53, and pass loosely through openings in the stop bars 59, or have sliding connections therewith. At their upper ends the rods 58 are provided with springs 60' bearing at their lower ends on said bars and at their upper ends against nuts or adjustable spring seats 61 and serving as cushions or elastic stops to arrest the downward movement of the feed wheels. The two stop bars 59 are connected on each side of the machine by links 62, and these links are connected on each side of the machine with arms 62' on a rocker shaft 63' which is provided with a lever 63, having a latch 64 which works with a notched quadrant or arc 65 for raising and lowering the stop bars 59 and locking them in adjusted position to determine the lower limit of movement of the several feed wheels.

One set of feed wheels 54 is located in front of the saw and the other behind it, as shown in Fig. 1, the arms 53 extending normally rearward and downward from the shafts 50, as shown in Fig. 1. The feed wheels being turned by the intermediate gears 57 in the same direction as the driving gears 51, as shown by arrows on Fig. 4, will readily rise and fall with the arms 53 to pass over knots or other irregularities in the contour of the lumber with which they work without undue strain on their supporting and driving connections, since the upward movement of the arms 53 around the driving gears of itself tends to turn the feed wheels in the opposite direction to that in which they are turned by said driving gears 51. The rear shaft 40 of the traveling support is provided with a pulley 66, and in line therewith the rear shaft 50 is provided with a pulley 67. A counterweighted lever 68, pivotally mounted on the rear shaft 40, carries adjacent to the pulley 66 an idle pulley and belt tightener 69, as shown in Fig. 1. A shaft 70 carried by bearings at the upper ends of arms 71 on a rocker shaft 72, which has bearings in brackets on the rear side of the frame, is provided with a pulley 73 and a friction wheel 74. The pulleys 66 and 67 are driven from the pulley 73 by a single belt passing around the vertically yielding idle pulley 69, thus admitting of the vertical adjustment of the traveling work support or table without affecting its operation. On the rear end of the tubular band wheel shaft 3 is mounted a friction driving wheel 75 with which the friction wheel 74 is arranged to work, as shown in Figs. 1 and 3. The wheel 74 is feathered and movable endwise on the shaft 70 and a rack 76 guided parallel with the shaft 70 in a bearing 77, is connected with the hub of said wheel by a collar 78, as shown in Figs. 1 and 3. A rod 79 passing through the tubular shaft 3, is movable endwise and rotatable therein. At its rear end it is swiveled in the bearing 77, which also encircles the shaft 70 and is provided with a pinion not shown meshing with the rack 76. At its front end said rod is connected with a hand lever 81 by which the shaft 70 is moved toward and from the friction driving wheel 75 to carry the friction wheel 74 into and out of engagement therewith. A spring 82 interposed between the lever 81 and a nut or adjustable shoulder on the rod 79, provides for a yielding or elastic engagement between said friction wheels 74 and 75. The lever 81 is locked in position to hold the friction wheels in engagement by means of a clamping screw 83 working with a curved arm 84 projecting from the hollow post or standard 85. In the standard 85 a vertical shaft is mounted, and this shaft is connected at its lower end by bevel gears with the rod 79, one of these gears 88 being feathered on said rod as shown in Fig. 3 so as to permit of the endwise movement of the latter. The shaft 86 is provided at its upper end with a hand wheel or crank 89 for turning it and for shifting the driven friction wheel 74 toward and from the center of the driving friction wheel 75 and thereby varying the speed of the feeding mechanism hereinbefore described, this adjustment of the friction wheel 74 being effected by the rotation of the rod 79 and its connection with said wheel.

It will be observed that by the construction and arrangement of the parts of the machine as herein shown and described, all the levers by which the operation of the machine is controlled are located within easy reach of the operator at the front side of the machine.

The shaft of the hand wheel 89 and hence the friction wheel 74 are secured in any desired position by a locking screw 90 threaded in the upper end of the post 85. The shaft 3 is provided with a pulley 91 for driving the band wheels and saw, and at each side of the frame on the standards 37 are mounted guides 92 by which the saw is held on the upper side in its true working plane.

From the foregoing description of the construction and arrangement of parts their operation will be obvious to those skilled in the art to which the invention pertains.

Various changes in details of construction and arrangement of parts may be made without departure from the principle and scope of the invention.

I claim:

1. In a resawing machine the combination with a horizontal band saw and a support on which lumber is fed thereto, of a shaft located above and parallel with the working side of the saw and provided with gears, arms pivotally mounted concentric with said shaft, toothed feed wheels mounted on said arms and movable therewith independently of one another toward and from said support, gears connecting said wheels with the gears on said shaft, a stop bar arranged above said arms and parallel with said shaft and adjustable toward and from said support, and stop rods pivoted to said arms and having sliding connections with the stop bar so as to limit the downward movement of the several feed wheels.

2. In a resawing machine the combination with a horizontal band saw and a support on which lumber is fed thereto, of a shaft located above and parallel with the working side of the saw and provided with gears, arms pivotally mounted concentric with said shaft, toothed feed wheels mounted on said arms and movable therewith independently of one another toward and from said support, gears connecting said wheels with the gears on said shaft, a stop bar arranged above said arms and parallel with said shaft and adjustable toward and from said support, stop rods pivoted to said arms and having sliding connections with said bar, a lever connected with said stop bar and adapted to shift the same up and down, and means for locking said lever to hold said bar in different positions.

3. In a resawing machine the combination with a horizontal band saw and a support on which lumber is fed thereto, of a shaft located above and parallel with the working side of the saw, and provided with gears, arms pivotally mounted concentric with said shaft, toothed feed wheels mounted on said arms and movable therewith independently of one another toward and from said support, gears connecting said wheels with the gears on said shaft, an adjustable stop bar connected by radius arms with the machine frame adjacent to said shaft, means for locking and holding said bar in adjusted position, and stop rods pivoted to the feed wheel arms and having sliding connections with said bar.

4. In a resawing machine the combination with a horizontal band saw and a support on which lumber is fed thereto, of shafts located above said support parallel with the working side of the saw, and provided with gears, arms pivotally mounted concentric with said shafts, toothed feed wheels mounted on said arms and movable therewith independently of one another toward and from said support, gears connecting said wheels with the gears on said shaft, stop bars arranged parallel with said shafts and connected with the machine frame adjacent thereto by radius arms, stop rods connecting the feed wheel arms with said bars, and an adjusting lever connected with said stop bars and provided with means for locking the same in different positions.

In witness whereof I hereto affix my signature in presence of two witnesses.

GEORGE M. PELTON.

Witnesses:
 CHAS. L. GOSS,
 FRANK E. DENNETT.